US011680147B2

(12) United States Patent
Karapetyan et al.

(10) Patent No.: US 11,680,147 B2
(45) Date of Patent: Jun. 20, 2023

(54) CATALYSTS FOR PRODUCING POLYURETHANES

(71) Applicant: Momentive Performance Materials GmbH, Leverkusen (DE)

(72) Inventors: Gnuni Karapetyan, Cologne (DE); Jose Godoy, Geneva (CH); Alberto Giovanni Melle, Geneva (CH)

(73) Assignee: Momentive Performance Materials GmbH (DE)

( * ) Notice: Subject to any disclaimer, the term of this patent is extended or adjusted under 35 U.S.C. 154(b) by 50 days.

(21) Appl. No.: 16/478,212

(22) PCT Filed: Jul. 10, 2018

(86) PCT No.: PCT/EP2018/068709
§ 371 (c)(1),
(2) Date: Jul. 16, 2019

(87) PCT Pub. No.: WO2020/011343
PCT Pub. Date: Jan. 16, 2020

(65) Prior Publication Data
US 2021/0332211 A1    Oct. 28, 2021

(51) Int. Cl.
| | | |
|---|---|---|
| *C08G 18/20* | (2006.01) | |
| *C08G 18/32* | (2006.01) | |
| *C08G 18/40* | (2006.01) | |
| *C08G 18/48* | (2006.01) | |
| *C08G 18/63* | (2006.01) | |
| *C08G 18/66* | (2006.01) | |
| *C08G 18/75* | (2006.01) | |
| *C08G 18/76* | (2006.01) | |
| *C08J 9/12* | (2006.01) | |

(52) U.S. Cl.
CPC .......... *C08J 9/125* (2013.01); *C08G 18/2081* (2013.01); *C08G 18/3275* (2013.01); *C08G 18/4072* (2013.01); *C08G 18/4829* (2013.01); *C08G 18/632* (2013.01); *C08G 18/6688* (2013.01); *C08G 18/7614* (2013.01); *C08J 2201/022* (2013.01); *C08J 2203/10* (2013.01); *C08J 2375/12* (2013.01)

(58) Field of Classification Search
CPC ... C07D 215/02; C08G 18/20; C08G 18/2081
See application file for complete search history.

(56) References Cited

U.S. PATENT DOCUMENTS

| | | |
|---|---|---|
| 5,710,191 A | 1/1998 | Listemann et al. |
| 6,423,756 B1 | 7/2002 | Ghobary et al. |
| 2004/0132847 A1 | 7/2004 | Burdeniuc |
| 2017/0210847 A1 | 7/2017 | Okiyama et al. |

FOREIGN PATENT DOCUMENTS

| | | |
|---|---|---|
| EP | 1332167 | 8/2003 |
| EP | 2657237 | 10/2013 |
| EP | 2857427 | 4/2015 |
| JP | 2013053230 | 3/2013 |
| JP | 2017171728 | 9/2017 |
| WO | 2002048229 | 6/2002 |

OTHER PUBLICATIONS

Hrycyna et al., "Quinine Dimers are Potent Inhibitors of the Plasmodium falciparum Chloroquine Resistance Transporter and Are Active against Quinoline-Resistant *P. falciparum*", 2014, ACS Chem Biol, 9, p. 722-730.*
Patent Cooperation Treaty (PCT), International Search Report and Written Opinion for Application PCT/EP2018/068709 filed Jul. 10, 2018, dated Mar. 25, 2019 International Searching Authority, EP.

* cited by examiner

*Primary Examiner* — Melissa A Rioja
(74) *Attorney, Agent, or Firm* — McDonald Hopkins LLC; Joseph Waters

(57) ABSTRACT

A tertiary amine compound is shown and described herein. The tertiary amine is a reaction product of an isocyanate and a compound bearing an active hydrogen and a bicyclic tertiary amine in its molecule. The tertiary amine compounds have been found to be suitable as catalysts for producing polyurethanes. Also shown and described are processes employing the tertiary amine compounds in a reaction of an isocyanate and an alcohol in the presence of the tertiary amine compounds. Further, also shown and described is a method for making the tertiary amine.

18 Claims, No Drawings

CATALYSTS FOR PRODUCING POLYURETHANES

CROSS REFERENCE TO RELATED APPLICATIONS

The present application is a 35 U.S.C. 371 national stage filing of PCT Application No. PCT/EP2018/068709 filed Jul. 10, 2018, the disclosure of which is incorporated herein by reference in its entirety.

FIELD OF INVENTION

The present invention relates to tertiary amine compounds. In particular, the tertiary amine compounds are derived from the reaction of a mono-, di- or polyisocyanate with a compound bearing a bicyclic tertiary amine and an active hydrogen in its molecule. The tertiary amine compounds may be employed as catalysts for producing cellular or non-cellular polyurethane materials. In its broadest aspect, the present invention resides in the use of a particular class of amine catalysts in the production of polyurethanes.

BACKGROUND

In polyurethane chemistry, the major focus is on the reaction of isocyanates with compounds that contain active hydrogen groups such as hydroxyl, water, amines, urea, urethane and others (The polyurethanes book, Editors David Randall and Steve Lee, John Willey & Sons, LTD, 2002). Polyurethane foams are produced by reacting a di- or polyisocyanate with compounds containing two or more active hydrogens, generally in the presence of blowing agent(s), catalysts, silicone-based surfactants and other auxiliary agents like fire retardants, anti-static and anti-microbial additives, fillers, hydrolysis stabilizers, lubricants, UV stabilizers, pigments and others. The active hydrogen-containing compounds are typically polyols, primary and secondary polyamines, chain extenders, cross-linkers and water. Two major reactions are promoted by the catalysts among the reactants during the preparation of polyurethane flexible foams, gelling and blowing. These reactions must proceed simultaneously and at a competitively balanced rate during the process in order to yield polyurethane foam with desired physical characteristics.

The reaction between the isocyanate and the polyol or polyamine, usually referred to as the gel reaction, leads to the polymer chain growth resulting to formation of a polymer with high molecular weight. This reaction is predominant in foams blown exclusively with physical blowing agents, low boiling point organic compounds in particular. The progress of the gel reaction increases the viscosity of the mixture and generally contributes to increasing of crosslinking density when cross linkers, polyfunctional polyols or isocyanates are used. The second major reaction occurs between isocyanate and water. This reaction is important for producing carbon dioxide gas, which promotes foaming. As a result, this reaction is often referred to as the blow reaction. The blow reaction is essential for avoiding or reducing the use of auxiliary blowing agents.

Both the gel and blow reactions occur in partially or totally water-blown polyurethane systems. In fact, the in-situ generation of carbon dioxide by the blow reaction plays an essential part in the preparation of water-blown polyurethane foams. Water-blown polyurethane foams, particularly flexible foams, are produced by both molded and slab foam processes.

As noted above, in order to obtain good urethane foam structure, the gel and blow reactions must proceed simultaneously and at optimum balanced rates. For example, if the carbon dioxide evolution is too rapid in comparison with the gel reaction, the foam tends to collapse. Alternatively, if the gel extension reaction is too rapid in comparison with the blow reaction generating carbon dioxide, foam rise will be restricted, resulting in a high-density foam. Also, poorly balanced crosslinking reactions will adversely impact foam stability. In practice, the balancing of these two reactions is controlled by the nature of the promoters and catalysts, generally amine and/or organometallic compounds, used in the process.

Polyurethane foam formulations usually include a polyol, a polyisocyanate, water, optional blowing agent (low boiling organic compound or inert gas, e.g., $CO_2$), a silicone type surfactant, and catalysts. For instance, flexible foams are generally open-celled materials, while rigid foams usually have a high proportion of closed cells.

Historically, catalysts for producing polyurethanes have been of three general types; tertiary amines (mono and poly), organometallics (primarily organotin compounds) and carboxylic acid salts of tin, bismuth and others. Organotin catalysts predominantly favor the gelling reaction, while amine catalysts exhibit a more varied range of blow/gel balance. Using tin catalysts in flexible foam formulations also increases the quantity of closed cells contributing to foam tightness. Tertiary amines also are effective as catalysts for the polymer chain growth and can be used in combination with the organic tin catalysts. For example, in the preparation of flexible slabstock foams, the "one-shot" process has been used wherein triethylenediamine is employed for promoting both the water-isocyanate reaction and the polymerization reaction, while an organic tin compound is used in synergistic combination to promote the polymerization reaction.

The processes for making flexible and molded foams are nicely described in "The polyurethanes book" (Editors David Randall and Steve Lee, John Willey & Sons, LTD, 2002). The process for making molded foams typically involves the mixing of the starting materials with polyurethane foam production machinery and pouring the reacting mixture, as it exits the mix-head, into a mold. In addition, the major advantage of molded foam compared to slabstock foam is an improvement in productivity, a reduction in the level of waste, and the ability to produce a wide variety of shapes and foam types in combination of hardness, density and other specific properties required for each end-use application (The polyurethanes book, Editors David Randall and Steve Lee, John Willey & Sons, LTD, 2002, page 189). The principal uses of flexible molded polyurethane foams are, e.g., automotive seats, automotive headrests and armrests, insulation systems with beneficial noise, vibration and harshness characteristics furniture cushions etc. Some of the uses of semi-flexible molded foams include, e.g., automotive instrument panels, energy managing foam, and sound absorbing foam.

Modern molded flexible and semi-flexible polyurethane foam production processes have enjoyed significant growth. Processes such as those used in Just-in-Time (JIT) supply plants have increased the demand for rapid demold systems, i.e., systems in which the molding time is as short as possible. Gains in productivity and/or reduced part cost result from reduced cycle times. Rapid cure High Resilience (HR) molded flexible foam formulations typically achieve demold times of three to five minutes. This is accomplished by using one or more of the following: a higher mold temperature, more reactive intermediates (polyols and/or isocyanates), increasing crosslinking density of polyurethane (PU) matrix via polyol blend or via isocyanate component, increased quantity of gelling catalyst, e) using more efficient catalysts or others.

Most polyurethane foams emit volatile organic compounds. These emissions can be composed of, for example, contaminations present in raw materials, catalysts, degradation products or unreacted volatile starting materials or other additives. Amine emissions from polyurethane foam have become a major topic of discussion particularly in car interior applications, in furniture or mattresses and the market is therefore increasingly demanding low-emission foams. The automotive industry in particular requires significant reduction of volatile organic compounds (VOC) and condensable compounds (fogging or FOG) in foams. An evaluation of VOC and FOG profiles of PU foams can be conducted by VDA 278 test. One of the main components of VOC emitting from flexible molded foams is the amine catalyst. To reduce such emissions, catalysts having a very low vapor pressure should be used. Alternatively, if the catalysts have reactive hydroxyl or amine groups they can be linked to the polymer network. If so, insignificant amounts of residual amine catalyst will be detected in the fogging tests. However, the use of reactive amine is not without difficulties. Reactive amines are known to degrade some fatigue properties such as humid aging compression set. Furthermore, the widely used reactive amines are monofunctional and promote chain termination during polymer growth and by becoming covalently bound to the polymer matrix lose their agility as catalysts. Thus, the development of efficient polyurethane catalysts with low emission profile is one of the important targets of modern polyurethane industry.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

Provided is a tertiary amine compound that is suitable for use as a catalyst for producing polyurethanes. The tertiary amine compound is an amino carbamate bearing a bicyclic tertiary amine.

In one aspect, provided is a tertiary amine compound of the Formula (I):

$$(R'-OC(O)N-)_a A(-NC(O)OR)_b \quad (I)$$

where a is 1-6 and b is 0-5;
R' is a bicyclic tertiary amine:
A is chosen from a C2-C35 hydrocarbon optionally comprising a halogen, an ether group, a tertiary amine or a combination thereof. C2-C35 hydrocarbon unit may contain aliphatic, cyclic, saturated, unsaturated and aromatic residues; and
R is chosen from a C1-C35 hydrocarbon optionally containing an aliphatic, cyclic, saturated, unsaturated and aromatic residue, an ether group, a halogen group, a tertiary amine group, a bicyclic tertiary amine group (R'), or a combination of two or more thereof.

In one embodiment of the tertiary amine compound, wherein R' is chosen from:

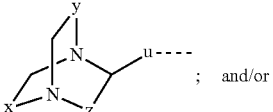

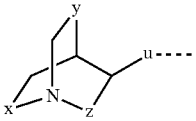

where x, y, z, and u are independently chosen from null (a bond), a C1-C35 hydrocarbon, a sulfonate ester (R—SO$_2$OR), or a phosphate ester (RO)$_3$P(O), where the C1-C35 hydrocarbon may contain aliphatic, cyclic, saturated, unsaturated and aromatic groups, halogen groups, ether groups, carbonates, amides, tertiary amines, or a combination of two or more thereof.

In one embodiment of the tertiary amine compound, R' is chosen from

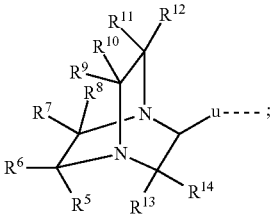

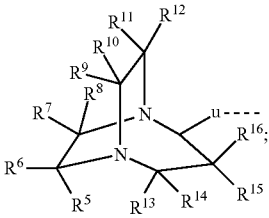

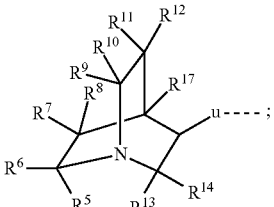

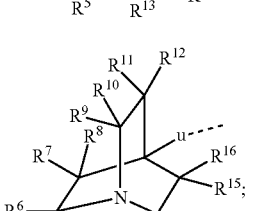

where R$_5$-R$_{17}$ are individually chosen from hydrogen, a halogen, a C1-C10 hydrocarbon, carbonate, an ether group, an amide, and a tertiary amine.

In one embodiment, the tertiary amine compound is of the formula:

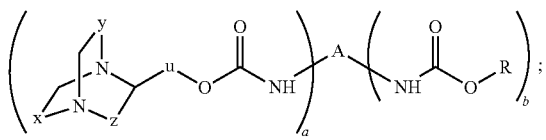
(XIII)

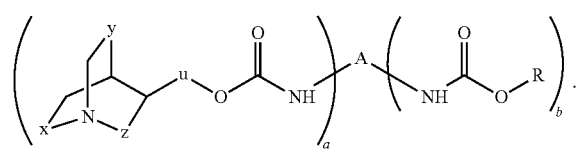
(XIV)

In one embodiment of the tertiary amine compound of any previous embodiments, (i) a is 1, 2, or 3; (ii) a is 1 and b is 1; or a is 2 and b is 0.

In one embodiment of the tertiary amine compound of any previous embodiments, A is chosen from a C2-C20 hydrocarbon residue optionally composed of aliphatic, cyclic, saturated, unsaturated and aromatic residues optionally including halogen, tertiary amine, ether, nitro residues.

In one embodiment of the tertiary amine compound of any previous embodiments, b is 1-4, and R is chosen from a C1-C10 hydrocarbon, a C1-C10 ether, or a group of Formula (II)-(VI):

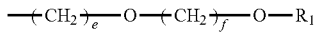
II

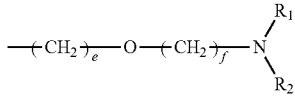
III

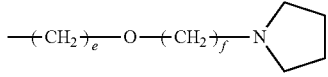
III-a

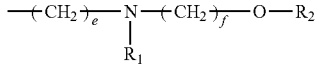
IV

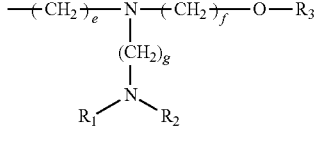
IV-a

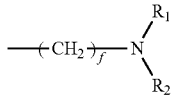
V

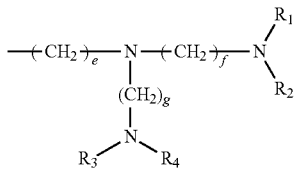
VI

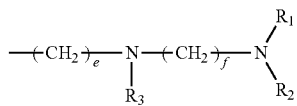
VI-b where e, f, and g are independently selected from 2-6; $R_1$-$R_4$ are independently chosen from a C1-C9 hydrocarbon, optionally where $R_1$ and $R_2$ may form a ring and/or $R^3$ and $R^4$ may form a five to ten member ring.

In one embodiment, R is chosen from a compound of the formula:

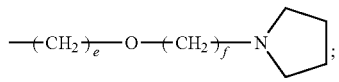
(III-a)

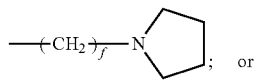
(V-a)

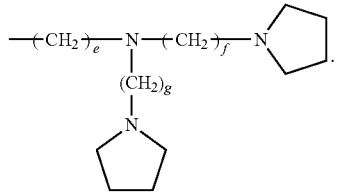
(VI-a)

In one embodiment of the tertiary amine compound of any previous embodiment, the compound is chosen from a formula of:

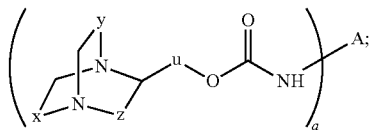

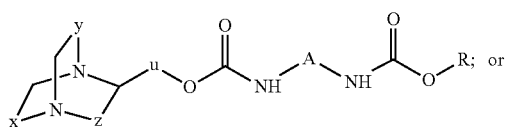

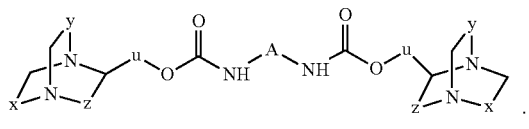

In one embodiment of the tertiary amine compound of any previous embodiment, the compound is chosen from:
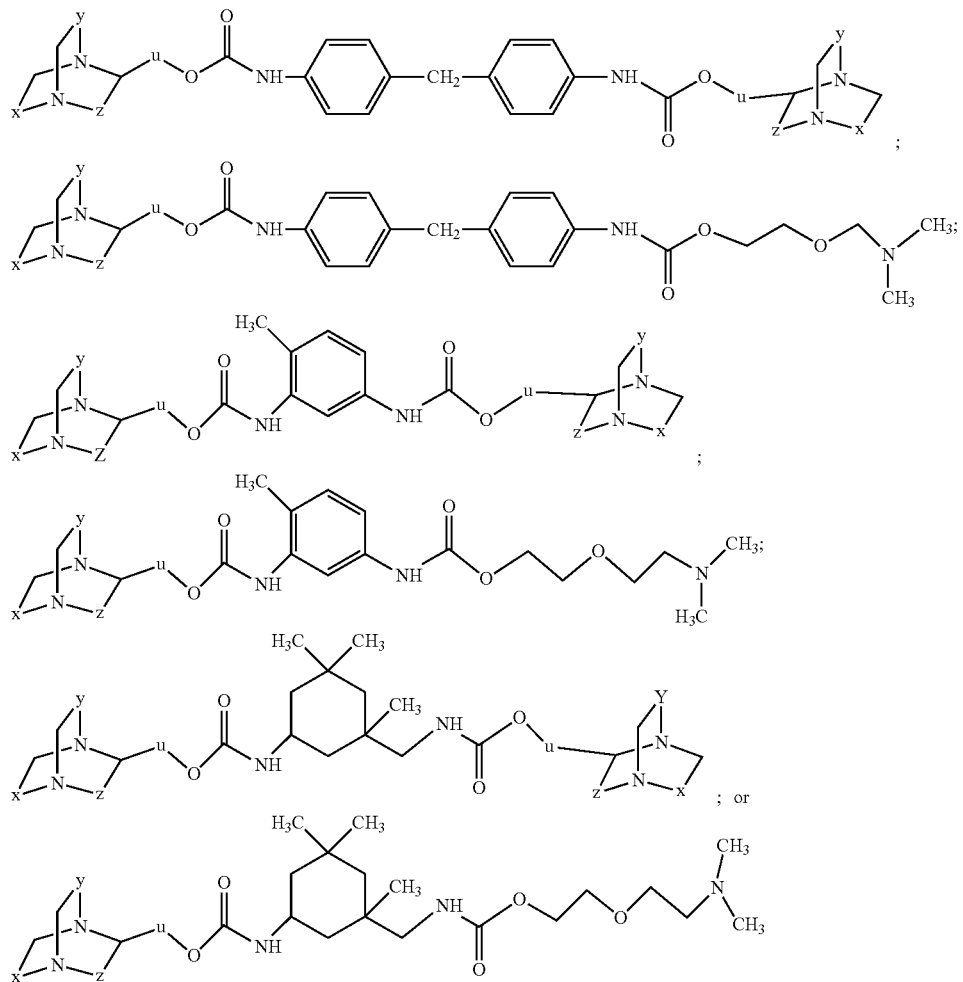
or a combination of two or more thereof.
In one embodiment of the tertiary amine compound of any previous embodiment, wherein u, x, y, and z are each —CH₂—.
In one embodiment of the tertiary amine compound of any previous embodiment, the compound is chosen from:
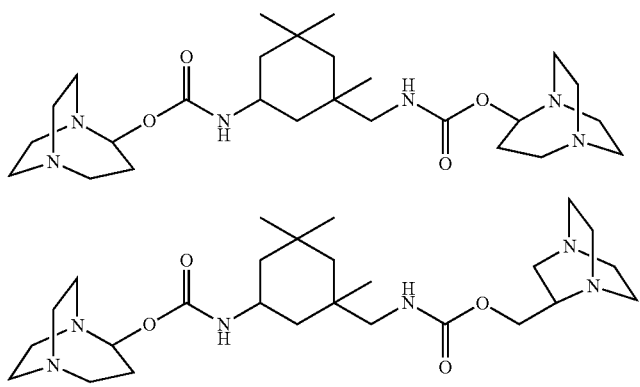

-continued

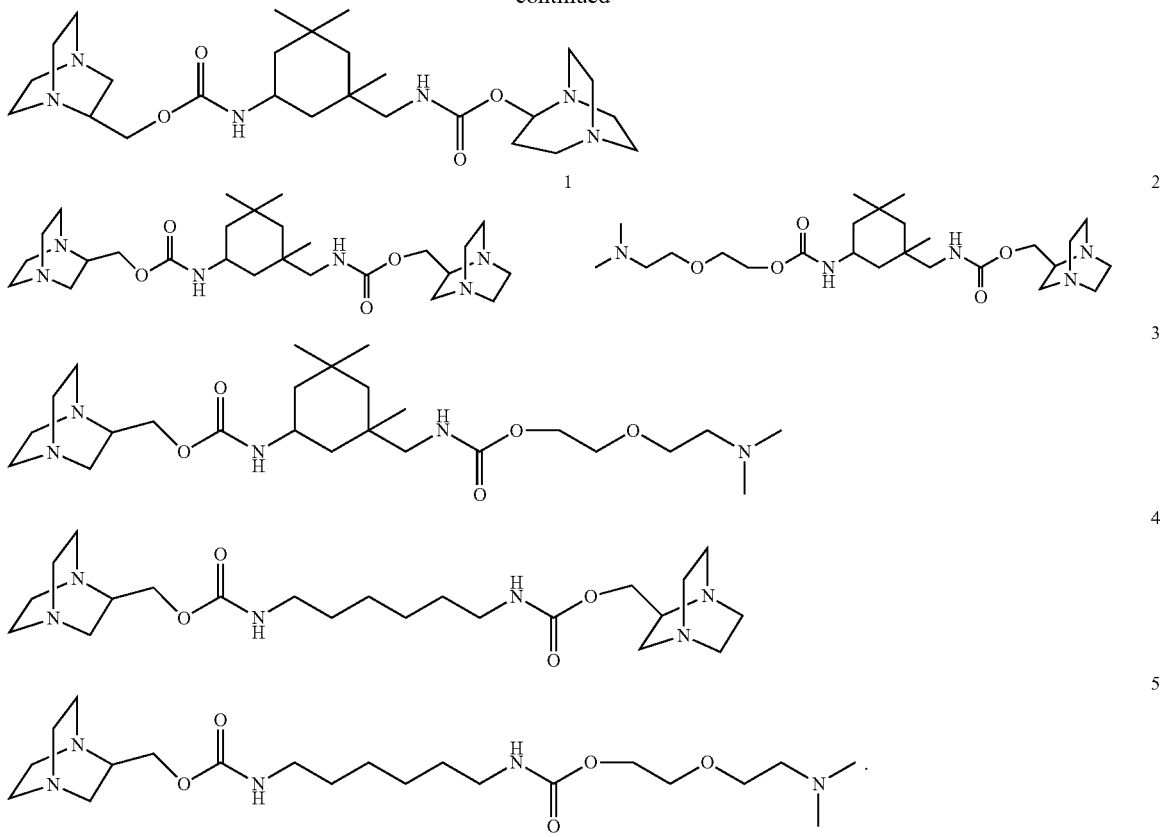

In another aspect of the invention, provided is a catalyst composition comprising one or more of the tertiary compounds of any of the previous embodiments, optionally comprising a diluent.

In one aspect of the invention, provided is a process for producing a polyurethane foam comprising reacting a polyfunctional organic compound with an organic polyisocyanate in the presence of a catalytically effective amount of a compound of the Formula (I).

In another aspect, provided is a process comprising the step of reacting an isocyanate compound with an alcohol in the presence of a catalyst, wherein the catalyst is chosen from a compound according to any of the previous embodiments.

In one embodiment, the process is for producing a carbamate.

In one embodiment, the isocyanate is a polyisocyanate and the alcohol is a polyol, and the process is for producing a polyurethane.

In one embodiment, the polyurethane is a cellular or non-cellular polyurethane, and the process optionally comprises a blowing agent.

In one embodiment of the process according to any previous embodiment, the polyurethane is a polyurethane foam, and the process optionally comprises a surfactant, a fire retardant, a chain extender, a cross-linking agent, an adhesion promoter, an anti-static additive, a hydrolysis stabilizer, a UV stabilizer, a lubricant, an anti-microbial agent, or a combination of two or more thereof.

In one embodiment of the process according to any previous embodiment, the catalyst is present in an amount of from about 0.005% to about 5% based on the total weight of the composition.

In still another aspect, provided is a polyurethane formed from the process of any of any previous embodiments.

In yet another aspect, provided is a method of forming a tertiary amine compound of any previous embodiments, the method comprising reacting an isocyanate of Formula (A) with a cyclic tertiary aminoalcohol of Formula (B), optionally with an organic compound of the Formula (C):

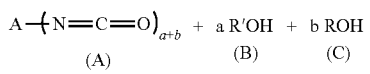

where a is 1-6 and b is 0-5.

In one embodiment, a is 1, 2, or 3.

In one embodiment of the method of making the tertiary amine compound, the isocyanate (A) is chosen from octadecylisocyanate; octylisocyanate; butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenyl cyclopropyl isocyanate; benzylisocyanate; 2-ethylphenylisocyanate; benzylisocyanate; meta and para-tolylisocyanate; 2-, 3-, or 4-nitrophenylisocyanates 2-ethoxyphenyl isocyanate; 3-methoxyphenyl isocyanate; 4-methoxyphenyl isocyanate; ethyl 4-isocyanatobenzoate; 2,6-dimethylphenylisocyanate; 1-naphythylisocyanate; (naphthyl) ethylisocyanate; isophorone diisocyanate (IPDI); toluene diisocyanate (TDI); diphenylmethane-4,4'-diisocyanate (MDI); hydrogenated diphenylmethane-4,4'-diisocyanate (H.12 MDI); tetra-methyl xylene diisocyanate (TMXDI); hexamethylene-1,6-diisocyanate (HDI); napthylene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylene-bis (2,6diethylphenyl isocyanate); 1,12-diisocyanatododecane; 1,5-diisocyanato-2-methylpentane; 1,4-diisocyanatobutane; and cyclohexylene diisocyanate and its isomers; uretidione dimers of HDI; trimethylolpropane trimer of TDI, isocyanurate trimers of TDI, HDI, IPDI, and biuret trimers of TDI, HDI, IPDI.

In one embodiment of the method of making the tertiary amine compound, the method is conducted as a continuous or batchwise process.

In one embodiment of the method of making the tertiary amine compound, the reaction is carried out in the presence of a solvent.

In one embodiment of the method of making the tertiary amine compound, the reaction is carried out at a temperature of about 20-140° C.

The following description discloses various illustrative aspects. Some improvements and novel aspects may be expressly identified, while others may be apparent from the description and drawings.

DETAILED DESCRIPTION

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

As used herein, the term "hydrocarbon group" is a group consisting of carbon and hydrogen atoms and includes acyclic hydrocarbon moieties, alicyclic hydrocarbon moieties and aromatic hydrocarbon moieties.

As used herein, the term "acyclic hydrocarbon group" means any straight chain or branched hydrocarbon group, preferably containing from 1 to 60 carbon atoms, which may be saturated or unsaturated. Suitable monovalent acyclic hydrocarbon groups include alkyl, alkenyl and alkynyl groups. Representative and non-limiting examples of monovalent acyclic hydrocarbon groups are methyl, ethyl, sec-butyl, tert-butyl, octyl, decyl, dodecyl, cetyl, stearyl, ethenyl, propenyl, and butynyl. Suitable divalent acyclic hydrocarbon groups include linear or branched alkylene groups. Representative and non-limiting examples of divalent acyclic hydrocarbon groups are methylene, ethylene, propylene, hexylene, methylethylene, 2-methylpropylene and 2,2-dimethylpropylene. Suitable trivalent acyclic hydrocarbon radicals include alkanetriyl radicals, such as, for example, 1,1,2-ethanetriyl, 1,2,4-butanetriyl, 1,2,8-octanetriyl and 1,2,4-hexanetriyl.

As used herein the term "alkyl" means any saturated straight or branched monovalent hydrocarbon group. In a preferred embodiment, monovalent alkyl groups are selected from linear or branched alkyl groups containing from 1 to 60 carbons per group, such as, for example, methyl, ethyl, propyl, iso-propyl, n-butyl, iso-butyl, sec-butyl, tert-butyl, pentyl, hexyl, heptyl, decyl and dodecyl.

As used herein, the term "alicyclic hydrocarbon group" means a group containing one or more hydrocarbon rings, preferably containing from 3 to 12 carbon atoms, which may optionally be substituted on one or more of the rings with one or more monovalent or divalent acyclic group containing preferably 1 to 6 carbon atoms. In the case of an alicyclic hydrocarbon group containing two or more rings, the rings may be fused rings in which the two rings share two or more carbon atoms in common, or rings that are bonded to each other through a covalent bond or divalent acyclic group. Suitable monovalent alicyclic hydrocarbon groups include, for example, cycloalkyl groups, such as cyclopentyl, cyclohexyl and cyclooctyl or cycloalkenyl groups, such as cyclopentenyl, cyclohexenyl or others. Suitable divalent hydrocarbon groups include, saturated or unsaturated divalent monocyclic hydrocarbon residues, such as, for example, 1,2-cyclopentylene, 1,3-cyclopentylene, 1,2-cyclohexylene, 1,3-cyclohexylene or 1,4-cyclohexylene and others. Suitable trivalent alicyclic hydrocarbon residues include cycloalkanetriyl residues such as, for example, 1-ethylene-2,4-cyclohexylene.

As used herein, the term "aromatic hydrocarbon group" means a hydrocarbon group containing one or more aromatic rings, which may, optionally, be substituted on the aromatic rings with one or more monovalent or divalent acyclic groups preferably containing 1 to 6 carbon atoms. In the case of an aromatic hydrocarbon group containing two or more rings, the rings may be fused rings in which the rings share two or more carbon atoms in common, or rings that are bonded to each other through a covalent bond or divalent acyclic group. Suitable monovalent aromatic hydrocarbon include, for example, phenyl, tolyl, 2,4,6-trimethylphenyl, naphthyl and anthryl, as well as aralkyl groups, such as, for example, 2-phenylethyl. Suitable divalent aromatic hydrocarbon groups include divalent monocyclic arene groups such as, for example, 1,2-phenylene, 1,4-phenylene, 4-methyl-1,2-phenylene and phenylmethylene. Suitable trivalent aromatic hydrocarbon groups include, for example, 1,3,5-phenylene and 1,2,4-phenylene.

The present technology relates to tertiary amine compounds. In particular, the present technology relates to tertiary amine compounds that are amino carbamates bearing bicyclic tertiary amines. In one aspect, the tertiary amine compounds are expressed by a compound of the Formula (I):

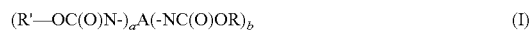

(R'—OC(O)N-)$_a$A(-NC(O)OR)$_b$   (I)

where a is 1-6 and b is 0-5;

R' is a bicyclic tertiary amine:

A is chosen from a C2-C35 hydrocarbon optionally comprising a halogen, an ether group, a tertiary amine or a combination thereof. C2-C35 hydrocarbon unit may contain aliphatic, cyclic, saturated, unsaturated and aromatic residues; and R is chosen from a C1-C35 hydrocarbon optionally containing an aliphatic, cyclic, saturated, unsaturated and aromatic residue, an ether group, a halogen group, a tertiary amine group, a bicyclic tertiary amine group (R'), or a combination of two or more thereof.

In embodiments, R may be a C1-C35 aliphatic hydrocarbon. In other embodiments, R may be a group containing a tertiary amine which may be linear, branched, or a cyclic tertiary amine. R may also be chosen from a bicyclic tertiary amine (R'). In still other embodiments, R may be a functional group from the following chemical structures (II)-(VI) with the following composition:

II

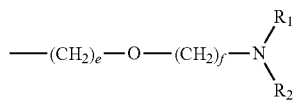
III

IV

IV-a

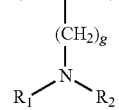
V

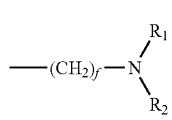

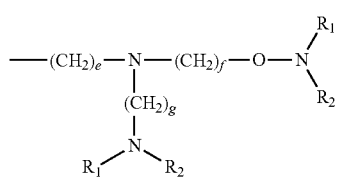
VI

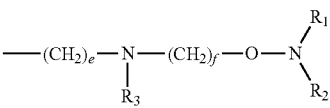
VI-b where e, f, and g are independently selected from C2-C9 hydrocarbon; $R_1$-$R_4$ are independently chosen from a C1-C9 hydrocarbon, optionally where $R_1$ and $R_2$ may form a ring and/or $R_3$ and $R_4$ may form a five to ten member ring. In one embodiment, R is chosen from a compound of the formula:

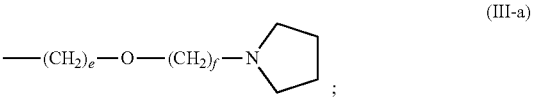
(III-a)

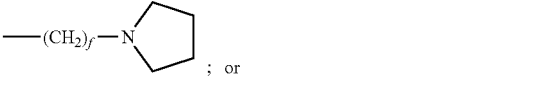
(V-a)

; or

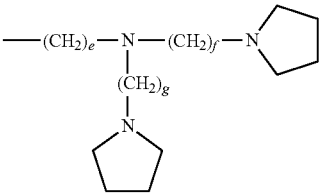
(VI-a)

.

In embodiments, e, f, and g and $R_1$-$R_4$ may be as follows:

TABLE 1

| | $R_1$ | $R_2$ | $R_3$ | $R_4$ | e | f | g |
|---|---|---|---|---|---|---|---|
| II | C1-C9 hydrocarbon, optionally attached to pyrollidinyl and/or piperidinyl residues | — | — | — | | C2-C9 hydrocarbon | — |
| III | C1-C9 hydrocarbon; pyrrolidinyl and piperidinyl or others, where $R_1$ and $R_2$ may form a ring | | — | — | | C2-C9 hydrocarbon | — |
| III-a | — | | — | — | | C2-C9 hydrocarbon | — |
| IV | C1-C9 hydrocarbon | | — | — | | C2-C9 hydrocarbon | — |
| IV-a | C1-C9 hydrocarbon; pyrrolidinyl and piperidinyl or others, where $R_1$ and $R_2$ may form a ring | | C1-C9 hydrocarbon | — | | C2-C9 hydrocarbon | |
| V | C1-C9 hydrocarbon; pyrrolidinyl and piperidinyl or others, where $R_1$ and $R_2$ may form a ring | | — | — | — | C2-C9 hydrocarbon | — |
| V-a | — | | | — | — | C2-C9 hydrocarbon | — |
| VI | C1-C9 hydrocarbon; pyrrolidinyl and piperidinyl or others, where $R_1$ and $R_2$ and/or $R_3$ and $R_4$ may form a ring | | | | C2-C9 hydrocarbon | | |
| VI-b | C1-C9 hydrocarbon; pyrrolidinyl and piperidinyl or others, where $R_1$ and $R_2$ may form a ring | | C1-C9 hydrocarbon | — | | C2-C9 hydrocarbon | — |

The A group may be a C2-C35 hydrocarbon that is a linear, branched, alicyclic, or aromatic containing group. The A group may include one or more cyclic groups and/or one or more aromatic groups. In one embodiment, A is a C2-C20 hydrocarbon, a C4-C15 hydrocarbon, or a C6-C10 hydrocarbon. In one embodiment, A is a C6-C20, a C6-C16, or a C6-C12, which may contain one or more aromatic moieties. In one embodiment, A is a C5-C20 alicyclic group, a C6-C16 alicyclic group, or a C6-C10 alicyclic group. It will be appreciated that for the aromatic and alicyclic groups, the number of carbon atoms may refer to the total number of carbon atoms in a single ring or multiple rings and the carbon atoms attached to the ring(s).

It will be appreciated, as is discussed in more detail below, that the compound of Formula I is derived from a mono- or polyisocyanate group. As such, the number and location of the points at which A is bound will depend on the number of isocyanate groups in the starting material for making the compound.

The bicyclic tertiary amine (R') is not particular limited and may be selected as desired for a particular purpose or intended application. In other embodiments, the bicyclic moiety is chosen from a moiety of the formula:

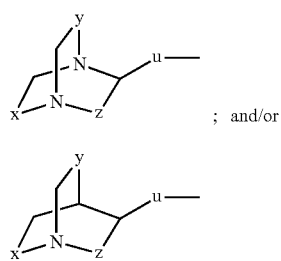

(VII)

; and/or (VIII)

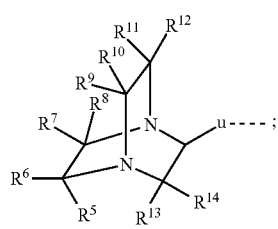

where x, y, z, and u are independently chosen from null (a bond), a C1-C35 hydrocarbon, a sulfonate ester (R—SO$_2$OR), or a phosphate ester [(RO)$_3$P(O)], where the C1-C35 hydrocarbon may contain aliphatic, cyclic, saturated, unsaturated and aromatic groups, halogen groups, ether groups, carbonates, amides, tertiary amines, or a combination of two or more thereof. As described, the carbon atoms in the ring (including when x, y, z and u are hydrocarbons) may be all bonded to hydrogen atoms and/or another group such as a hydrocarbon group, halogen groups, ether groups, carbonates, amides, tertiary amines, or a combination of two or more thereof. In one embodiment, the carbon atoms in the ring are all bonded to hydrogen atoms. In one embodiment, the carbon atoms carry one or more hydrocarbon substituents.

It will be appreciated that when z contains more than one carbon atom to provide a larger ring, then u may be attached to any of those carbon atoms.

In one embodiment, the bicyclic group is of the Formulas (IX)-(XII):

(IX)

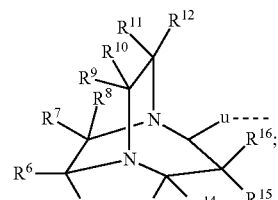

(X)

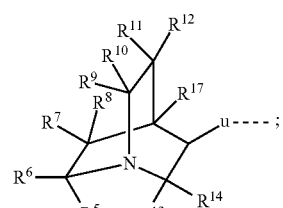

(XI)

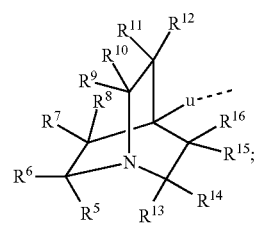

(XII)

where $R_5$-$R_{17}$ are individually chosen from hydrogen, a halogen, a C1-C10 hydrocarbon, carbonate, an ether group, an amide, and a tertiary amine. In one embodiment, $R_5$-$R_{17}$ are each hydrogen.

The methods for producing bicyclic tertiary amine precursors for preparation of the tertiary amine compounds represented by the above Formula (I) are not particularly limited by those described in EP2657237B1 or U.S. Pat. No. 5,710,191 and other residues may be included. The tertiary amine compounds represented by the above Formula (I) can be diluted in plasticizers and/or diluents like water, glycols (ethylene glycol, di-, tri-ethylene glycol, propylene glycol, di-, tri-propylene glycol, 2-methyl-1,3-propanediol or others), mono- or di-alkyl ethers of glycols, polyether polyols, plasticizers, waxes, and natural oils like castor oil, soybean oil etc. and mixtures thereof.

In embodiments, the tertiary amine compounds of Formula (I) may be compounds of the Formulas (XIII) or (XIV):

(XIII)

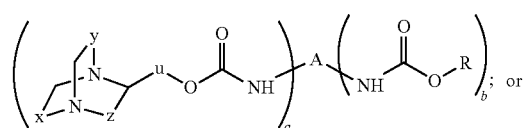

; or (XIV)

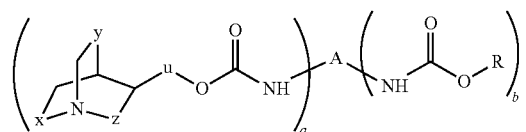

where a is 1-6 and b is 0-5;
A is chosen from a C2-C35 hydrocarbon optionally comprising a halogen, an ether group, a tertiary amine or a combination thereof. C2-C35 hydrocarbon unit may contain aliphatic, cyclic, saturated, unsaturated and aromatic residues;

x, y, z, and u are independently chosen from null (a bond), a C1-C35 hydrocarbon, a sulfonate ester (R—SO$_2$OR), or a phosphate ester (RO)$_3$P(O), where the C1-C35 hydrocarbon may contain aliphatic, cyclic, saturated, unsaturated and aromatic groups, halogen groups, ether groups, carbonates, amides, tertiary amines, or a combination of two or more thereof and R is chosen from a C1-C35 hydrocarbon optionally containing an aliphatic, cyclic, saturated, unsaturated and aromatic residue, an ether group, a halogen group, a tertiary amine group, or a combination of two or more thereof. While the explicit carbon atoms shown in the bicyclic ring are not shown as having any substitutions, it will be appreciated that those carbon atoms may be bonded to a hydrogen atom and/or another group such as a hydrocarbon. Non-limiting examples of suitable compounds of Formula (I) include:

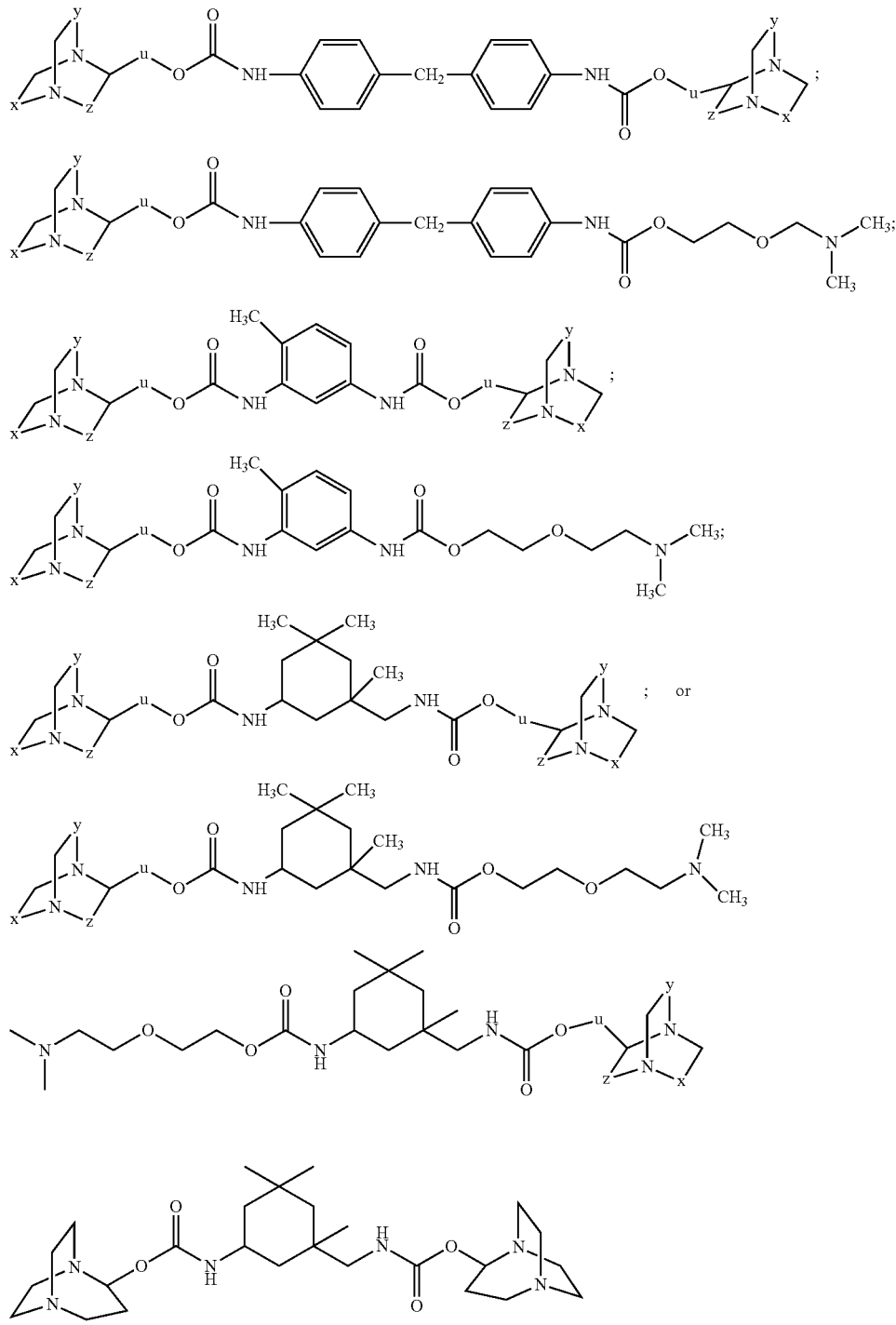

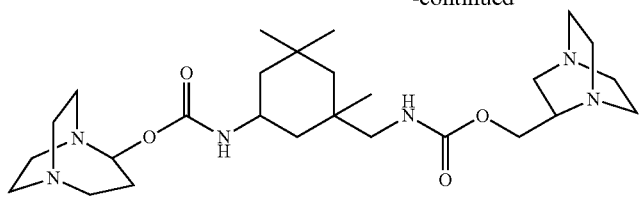
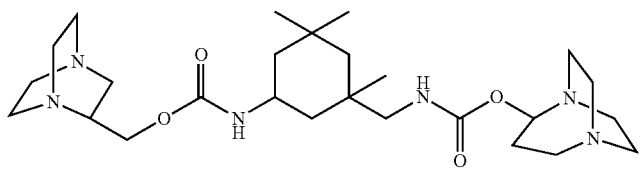
or a combination of two or more thereof. In embodiments, x, y, z, and u may be a C1-C10 hydrocarbon. In embodiments x, y, z, and u are each CH$_2$. In further embodiments, the compound of Formula (I) is chosen from:
1
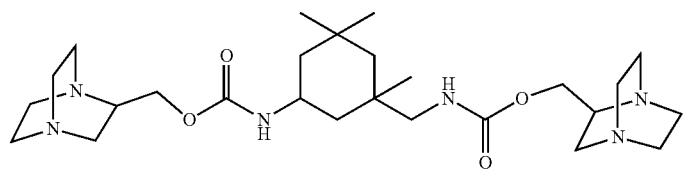
2
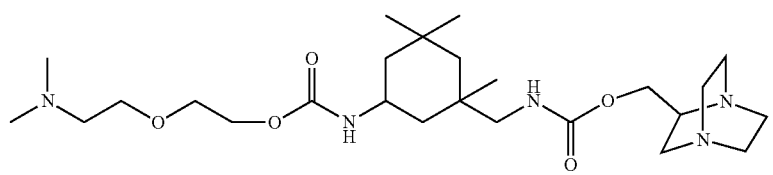
3
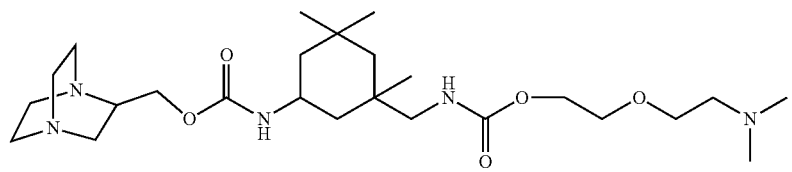
4
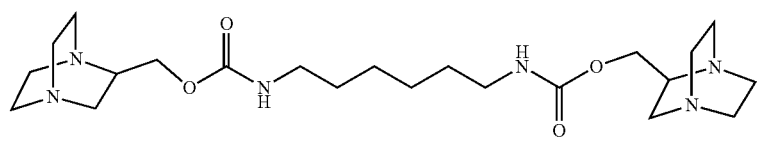
5
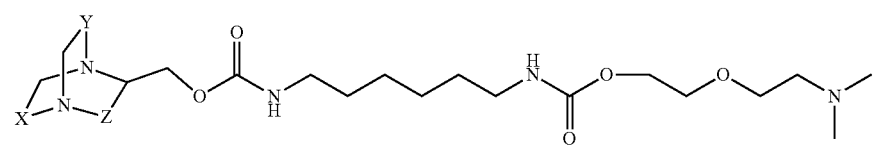

The compounds of Formula (I) may be prepared by the reaction of an isocyanate, a tertiary bicyclic amino alcohol, optionally with another alcohol. In embodiments, the compounds may be prepared by reacting a mono- or polyisocyanate, where a=1, 2, 3, 4, 5 and 6 with a hydroxy functional bicyclic tertiary amine optionally in the presence of another alcohol. The reaction may be as follows:

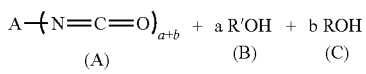

where A, R', and R can be as described above, a is 1-6, and b is 0-5. The reaction can be carried out without solvent at temperatures where components (A), (B), (C), or their mixtures are liquids. Furthermore, aprotic organic solvents (ethyl acetate, acetone, acetonitrile, ketones, haloalkanes, diglyme, dioxane, ethers—diethylether, methyl butyl ether, tetrahydrofuran, alkanes, dimethyl sulfoxide (DMSO), dimethylformamide (DMF), toluene, benzene, xylene and their analogues or mixtures thereof) can be used to dissolve or melt the components (A) and/or (B) and/or optionally (C) prior mixing them. Preferable temperature ranges for the reaction are 20-140° C., more preferable 40-120° C., the most preferable 60-100° C. Generally, it is preferred to perform the reaction under inert atmosphere (nitrogen, argon, or others) to exclude moisture. After reaction completion, the solvents can be partially or fully removed to afford final compounds, their mixtures or concentrated solutions thereof. Catalyst blends containing tertiary amine products with a general Formula (I) in diluents like water, glycols (ethylene glycol, di-, tri-ethylene glycol, propylene glycol, di-, tri-propylene glycol, 2-methyl-1,3-propanediol or others), mono- and di-alkyl ethers of glycols, polyether polyols, plasticizers, waxes, and natural oils like castor oil, soybean oil and others and mixtures thereof are recommended to prepare to facilitate the dosing of the catalysts for production of polyurethanes.

Both, batch and continuous processes can be applied for production of the catalysts. Pure components (A), (B) and (C) or their solutions can be used for the production of the catalyst via those processes. In batch process, corresponding isocyanate component (A) can be added to the desired liquid tertiary aminoalcohol (B) or to the melted solution of the tertiary aminoalcohol (B) in desired solvent at certain temperature. After completion of the reaction, volatile solvents can be removed to afford the target catalyst, which can be used for further steps. Alternatively, in batch process at certain temperature, corresponding tertiary aminoalcohol (B) or a melted solution of (B) in desired solvent can be added to the desired liquid isocyanate component (A) or to melted solution of (A) in desired solvent. After completion of the reaction, volatile solvents can be removed to afford the target catalyst, which can be used for further steps. For conducting a multicomponent reaction with (A), (B) and (C), at first either (B) or (C) is added to (A) at certain temperature and after completion of the first step correspondingly (C) or (B) is added to finish the synthesis of desired compounds. After completion of the reaction, volatile solvents can be removed to afford the target catalyst, which can be used for further steps. For the catalyst production via continuous process, a continuous processor can be used designed to mix liquid or dissolved components (A), (B), and optionally (C) in desired mixing ratio and sequence on a continuous basis by utilizing a combination of mixing and conveying action. The mixing chamber of a continuous processor may also be heated or cooled to optimize the mixing cycle. To afford the target catalyst, the volatile solvents can be removed after completion of the reaction at the final step. Alternatively, the accumulated reaction mixture can be submitted to distillation to provide the target catalyst, which can be used for further steps.

Non-limiting examples of groups suitable as the tertiary amine bearing group R'OH for carrying out the reaction include:

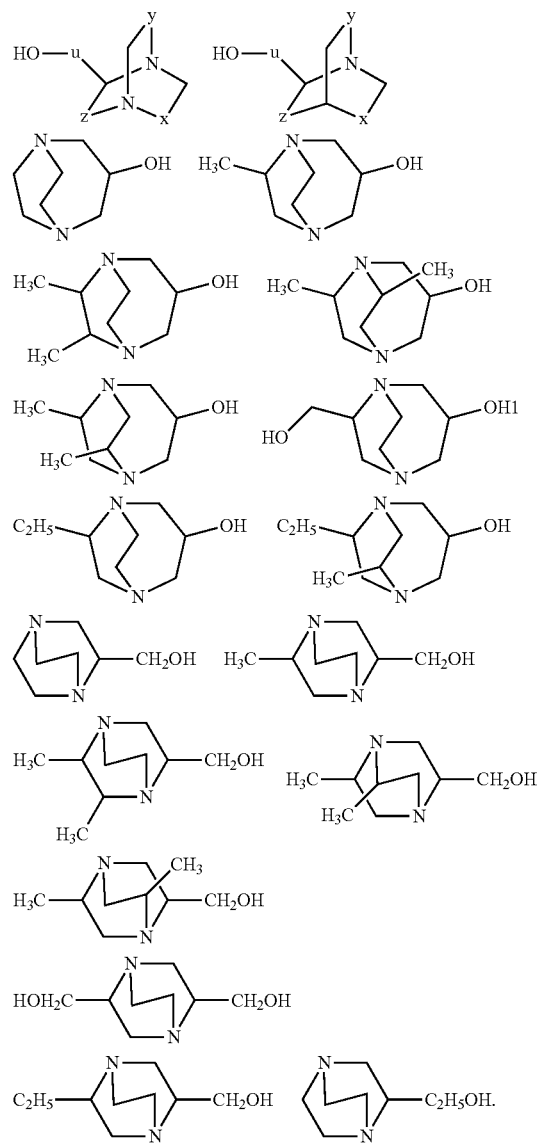

In a representative case, when a=2, the compounds of Formula (Ia) may be prepared optionally by a) co-addition of the corresponding mixture of R-OH (XVI) and (XV) to isocyanate compound (XVII); b) synchronous addition of R-OH (XVI) and (XV) to isocyanate compound (XVII); c) sequential addition of R-OH (XVI) to isocyanate compound (XVII) followed by addition of (XV) and/or c) sequential addition of (XV) to isocyanate compound (XVII) followed by addition of R—OH (XVI) where A, a, u, x, y, and z may be as described above.

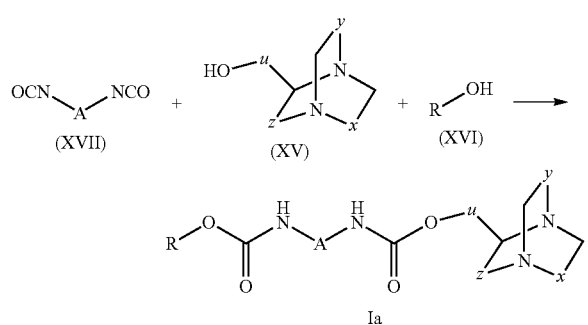

The reaction is conducted to provide compounds with a general Formula (I) and/or (Ia) containing at least one bicyclic group bearing a tertiary amine.

The isocyanates (e.g., (A)) used to form the compound of Formula (I) are not particularly limited and may be chosen from a mono-, di-, or polyisocyanate. Examples of monoisocyanates include, but are not limited to, octadecylisocyanate; octylisocyanate; butyl and t-butylisocyanate; hexyl isocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzylisocyanate; meta and para-tolylisocyanate; 2-, 3-, or 4-nitrophenylisocyanates; 2-ethoxyphenyl isocyanate; 3-methoxyphenyl isocyanate; 4-methoxyphenyl isocyanate; ethyl 4-isocyanatobenzoate; 2,6-dimethylphenylisocyanate; 1-naphythylisocyanate; (naphthyl) ethylisocyanates; and the like. Examples of diisocyanates include, but are not limited to, isophorone diisocyanate (IPDI); isomers of toluene diisocyanate (TDI); isomers of diphenylmethane-4,4'-diisocyanate (MDI); isomers of 4,4'-methylenebis(cyclohexyl isocyanate)H12; tetra-methyl xylene diisocyanate (TMXDI); hexamethylene-1,6-diisocyanate (HDI); napthylene-1,5-diisocyanate; 3,3'-dimethoxy-4,4'-biphenyldiisocyanate; 3,3'-dimethylbiphenyl-4,4'-diisocyanate; isomers of phenylene diisocyanate; 4,4'-biphenyldiisocyanate; tolidinediisocyanate; 2,4,6-triisopropyl meta-phenylene diisocyanate; isomers of bis(isocyanatomethyl)benzene; isomers of trimethylhexamethylene diisocyanate; isomers of tetramethylene xylene diisocyanate; 4,4'-methylene-bis (2,6-diethylphenyl isocyanate); 1,12-diisocyanatododecane; 1,5-diisocyanato-2-methylpentane; 1,4-diisocyanatobutane; and cyclohexylene diisocyanate and its isomers. Biuret, allophonate, carbidiimide, uretidione modified isocyanates can be used as (II). Examples of triisocyanates or their equivalents include, but are not limited to, the trimethylolpropane trimer of TDI, and the like, isocyanurate trimers of TDI, HDI, IPDI, and the like, and biuret trimers of TDI, HDI, IPDI, and the like. Examples of higher isocyanate functionalities include copolymers of TDI/HDI, and the like, as well as MDI oligomers.

The tertiary amine compounds may be used as a catalyst in the general reaction of an isocyanate with an alcohol to form a carbamate linkage. This may include simple carbamates, polyurethanes, including the production of cellular and/or non-cellular polyurethane materials, and the production of polyurethane foams.

In forming a carbamate, any isocyanate compound that reacts with a hydroxylated compound is useful in the present invention. The isocyanate compounds may be aliphatic, aromatic, substituted aromatic, heteroaromatic or substituted heteroaromatic. Suitable aliphatic isocyanates include, but are not limited to: ($C_1$-$C_{12}$)alkylisocyanates, substituted ($C_1$-$C_{12}$)alkylisocyanates, ($C_2$-$C_{12}$)alkenylisocyanates, substituted ($C_2$-$C_{12}$)alkenylisocyanates, ($C_2$-$C_{12}$)alkynylisocyanates, substituted ($C_2$-$C_{12}$)alkenylisocyanates, ($C_7$-$C_{12}$)aralkylisocyanates, and substituted ($C_7$-$C_{12}$)aralkylisocyanates. Examples of suitable isocyanates include, but are not limited to: phenylisocyanate, benzylisocyanate, methylisocyanate, ethylisocyanate, butylisocyanate, 2,6-dichlorophenylisocyanate.

The hydroxylated compounds useful in the present invention are any compounds that contain a hydroxyl group and will react with an isocyanate compound. Such hydroxylated compounds include alcohols and oxime compounds. Suitable alcohols useful in the present invention include, but are not limited to: ($C_1$-$C_{12}$)alkanols, halo($C_1$-$C_{12}$)alkanols, ($C_2$-$C_{12}$)alkenols, halo($C_2$-$C_{12}$)alkenols, ($C_2$-$C_{12}$)alkynols, halo($C_2$-$C_{12}$)alkynols, ($C_1$-$C_{12}$)aralkanols, halo($C_1$-$C_{12}$)aralkanols, phenol, substituted phenol, isothiazole, substituted isothiazole, naphthol, and substituted naphthol. Suitable alcohols include, but are not limited to, methanol, ethanol, propanol, butanol, benzyl alcohol, phenethyl alcohol, propynyl alcohol, halopropynyl alcohol, and allyl alcohol.

The term "polyurethane" as utilized herein refers to the reaction product of an isocyanate containing two or more isocyanate groups with compounds containing two or more active hydrogens, e.g., polyols (polyether polyols, polyester polyols, copolymer polyols also known as graft polyols), primary and secondary amine terminated polymer known as polyamines. These reaction products are generally known to those skilled in the art as polyurethanes and polyurethane (ureas). The reaction in forming cellular and non-cellular foams optionally includes a blowing agent. In the production of a polyurethane foam, the reaction includes a blowing agent and other optional components such as surfactants, fire retardants, chain extenders, cross-linking agents, adhesion promoters, anti-static additives, hydrolysis and UV stabilizers, lubricants, anti-microbial agents, catalysts and/or other application specific additives can be used for production of compact or cellular polyurethane materials [The polyurethanes book, Editors David Randall and Steve Lee, John Willey & Sons, LTD, 2002]. The present catalyst materials of the invention are especially suitable for making flexible, semi-flexible, and rigid foams using the one shot foaming, the quasi-pre-polymer and the pre-polymer processes. The polyurethane manufacturing process of the present invention typically involves the reaction of, e.g., a polyol, generally a polyol having a hydroxyl number from about 10 to about 700, an organic polyisocyanate, a blowing agent and optional additives known to those skilled in the art and one or more catalysts, at least one of which is chosen from the subject tertiary amine compound. As the blowing agent and optional additives, flexible and semi-flexible foam formulations (hereinafter referred to simply as flexible foams) also generally include, e.g., water, organic low boiling auxiliary blowing agent or an optional non-reacting gas, silicone surfactants, optional catalysts, and optional cross-linker(s). Rigid foam formulations often contain both a low boiling organic material and water for blowing.

The "one shot foam process" for making polyurethane foam is a one-step process in which all of the ingredients necessary (or desired) for producing the foamed polyurethane product including the polyisocyanate, the organic polyol, water, catalysts, surfactant(s), optional blowing agents and the like are efficiently mixed , poured onto a moving conveyor or into a mold of a suitable configuration and cured [Chemistry and Technology of Polyols for Polyurethanes, by Mihail Ionescu, Rapra Technology LTD. (2005)]. The one shot process is to be contrasted with the prepolymer and quasi-prepolymer processes [Flexible polyurethane foams, by Ron Herrington and Kathy Hock, Dow Plastics, 1997]. In the prepolymer process, most prepolymers in use today are isocyanate-tipped. A strict prepolymer is formed when just enough polyisocyanate is added to react with all hydroxyl sites available. If there is an excess or residual isocyanate monomer present, the product is called a quasi-prepolymer. A prepolymer or a quasi-prepolymer is first prepared in the absence of any foam-generating constituents. In a second step, the high molecular weight polyurethanes materials are formed by the reaction of a prepolymer with water and/or chain extender such as: ethylene glycol, diethylene glycol, 1,4-butane diol or a diamine in the presence of catalyst.

The tertiary amine compounds of Formula (I) may be used as a sole catalyst or in combination with one or more other subject tertiary amine catalysts and/or with other catalysts useful in the polyurethane production process. Two or more different tertiary amine compounds under the Formula (I) may also be used together as the catalyst. The tertiary amine compound(s) of Formula (I) may be present in the reactive mixture including all required components in an amount of from about 0.005% to about 5%; about 0.01% to about 3.0%; or about 0.03% to about 1.00 based on the total weight of the composition.

Other catalysts useful for producing polyurethane foams include, for example, tertiary amines, organometallic catalysts, e.g., organotin catalysts, metal salt catalysts, e.g., alkali metal or alkaline earth metal carboxylate catalysts, other delayed action catalysts, or other known polyurethane catalysts.

Organometallic catalysts or metal salt catalysts also can, and often are, used in polyurethane foam formulations. For example for flexible slabstock foams, the generally preferred metal salt and organometallic catalysts are stannous octoate and dibutyltin dilaurate respectively. For flexible molded foams, exemplary organometallic catalysts are dibutyltin dilaurate and dibutyltin dialkylmercaptide. For rigid foams exemplary metal salt and organometallic catalysts are potassium acetate, potassium octoate and dibutyltin dilaurate, respectively. Metal salt or organometallic catalysts normally are used in small amounts in polyurethane formulations, typically from about 0.001 parts per hundred parts (pphp) to about 0.5 phpp based on the total weight of the composition.

Polyols which are useful in the process of the invention for making a polyurethane, particularly via the one-shot foaming procedure, are any of the types presently employed in the art for the preparation of flexible slabstock foams, flexible molded foams, semi-flexible foams, and rigid foams. Such polyols are typically liquids at ambient temperatures and pressures and include polyether polyols and polyester polyols having hydroxyl numbers in the range of from about 15 to about 700. The hydroxyl numbers are preferably between about 20 to about 60 for flexible foams, between about 100 to about 300 for semi-flexible foams and between about 250 to about 700 for rigid foams.

For flexible foams the preferred functionality, i.e., the average number of hydroxyl groups per molecule of polyol, of the polyols is about 2 to about 4 and most preferably about 2.3 to about 3.5. For rigid foams, the preferred functionality is about 2 to about 8 and most preferably about 3 to about 5.

Of the polyamines, diamines such as, e.g., piperazine, 2,5-dimethylpiperazine, bis(4-aminophenyl)ether, 1,3-phenylenediamine and hexamethylenediamine are preferred.

Polyfunctional organic compounds which can be used in the process of the present invention, alone or in admixture as copolymers, can be any of the following non-limiting classes:

(a) polyether polyols derived from the reaction of polyhydroxyalkanes with one or more alkylene oxides, e.g., ethylene oxide, propylene oxide, etc.;

(b) polyether polyols derived from the reaction of high-functionality alcohols, sugar alcohols, saccharides and/or high functionality amines, if desired in admixture with low-functionality alcohols and/or amines with alkylene oxides, e.g., ethylene oxide, propylene oxide, etc.;

(c) polyether polyols derived from the reaction of phosphorus and polyphosporus acids with alkylene oxides, e.g., ethylene oxide, propylene oxide, etc., (d) polyether polyols derived from the reaction of polyaromatic alcohols with alkylene oxides, e.g., ethylene oxide, propylene oxide, etc.;

(e) polyether polyols derived from the reaction of ring-opening polymerization of tetrahydrofurane;

(f) polyether polyols derived from the reaction of ammonia and/or an amine with alkylene oxides, e.g., ethylene oxide, propylene oxide, etc.;

(g) polyester polyols derived from the reaction of a polyfunctional initiator, e.g., a diol, with a hydroxycarboxylic acid or lactone thereof, e.g., hydroxylcaproic acid or e-carprolactone;

(h) polyoxamate polyols derived from the reaction of an oxalate ester and a diamine, e.g., hydrazine, ethylenediamine, etc. directly in a polyether polyol;

(i) polyurea polyols derived from the reaction of a diisocyanate and a diamine, e.g., hydrazine, ethylenediamine, etc. directly in a polyether polyol.

For flexible foams, preferred types of alkylene oxide adducts of polyhydroxyalkanes are the ethylene oxide and propylene oxide adducts of aliphatic triols such as glycerol, trimethylol propane, etc. For rigid foams, the preferred class of alkylene oxide adducts are the ethylene oxide and propylene oxide adducts of ammonia, toluene diamine, sucrose, and phenol-formaldehyde-amine resins (Mannich bases).

Grafted or polymer polyols are used extensively in the production of flexible foams and are, along with standard polyols, one of the preferred class of polyols useful in the process of this invention. Polymer polyols are polyols that contain a stable dispersion of a polymer, for example in the polyols a) to e) above and more preferably the polyols of type a). Other polymer polyols useful in the process of this invention are polyurea polyols and polyoxamate polyols.

The polyisocyanates that are useful in the polyurethane foam formation process of this invention are organic compounds that contain at least two isocyanate groups and generally will be any of the known aromatic or aliphatic polyisocyanates. Suitable organic polyisocyanates include, for example, the hydrocarbon diisocyanates, (e.g. the alkylenediisocyanates and the arylene diisocyanates), such as methylene diphenyl diisocyanate (MDI) and 2,4- and 2,6-toluene diisocyanate (TDI), as well as known triisocyanates and polymethylene poly(phenylene isocyanates) also known as polymeric or crude MDI. For flexible and semi-flexible foams, the preferred isocyanates generally are, e.g., mixtures of 2,4-tolulene diisocyanate and 2,6-tolulene diisocyanate (TDI) in proportions by weight of about 80% and about 20% respectively and also about 65% and about 35% respectively based on the total weight of the composition of TDI; mixtures of TDI and polymeric MDI, preferably in the proportion by weight of about 80% TDI and about 20% of crude polymeric MDI to about 50% TDI and about 50% crude polymeric MDI based on the total weight of the composition; and all polyisocyanates of the MDI type. For rigid foams, the preferred isocyanates are, e.g., polyisocyanates of the MDI type and preferably crude polymeric MDI.

The amount of polyisocyanate included in the foam formulations used relative to the amount of other materials in the formulations is described in terms of "Isocyanate Index". "Isocyanate Index" means the actual amount of polyisocyanate used divided by the theoretically required stoichiometric amount of polyisocyanate required to react with all the active hydrogen in the reaction mixture multiplied by one hundred (100) [see Oertel, Polyurethane Handbook, Hanser Publishers, New York, N.Y. (1985)]. The Isocyanate Indices in the reaction mixtures used in the process of this invention generally are between 60 and 140. More usually, the Isocyanate Index is: for flexible TDI foams, typically between 85 and 120; for molded TDI foams, normally between 90 and 105; for molded MDI foams, most often between 70 and 90; and for rigid MDI foams, generally between 90 and 130. Some examples of polyisocyanurate rigid foams are produced at indices as high as 250-400.

Water often is used as a reactive blowing agent in both flexible and rigid foams. In the production of flexible slabstock foams, water generally can be used in concentrations of, e.g., between 2 to 6.5 parts per hundred parts (pphp) of polyol blend, and more often between 3.5 to 5.5 pphp of polyol blend. Water levels for TDI molded foams normally range, e.g., from 3 to 4.5 pphp of polyol blend. For MDI molded foam, the water level, for example, is more normally between 2.5 and 5 pphp. Rigid foam water levels, for example, range from 0.5 to 5 pphp, and more often from 0.5 to 2 pphp of polyol blend. Physical blowing agents such as blowing agents based on volatile hydrocarbons or halogenated hydrocarbons and other non-reacting gases can also be used in the production of polyurethane foams in accordance with the present invention. A significant proportion of the rigid insulation foam produced is blown with volatile hydrocarbons or halogenated hydrocarbons and the preferred blowing agents are the hydrochlorofluorocarbons (HCFC) and the volatile hydrocarbons pentane and cyclopentane. In the production of flexible slabstock foams, water is the main blowing agent; however, other blowing agents can be used as auxiliary blowing agents. For flexible slabstock foams, the preferred auxiliary blowing agents are carbon dioxide and dichloromethane (methylene chloride). Other blowing agents may also be used such as, e.g., the chlorofluorocarbon (CFC) and the trichloromonofluoromethane (CFC-11).

Flexible molded foams typically do not use an inert, auxiliary blowing agent, and in any event incorporate less auxiliary blowing agents than slabstock foams. However, there is a great interest in the use of carbon dioxide in some molded technology. MDI molded foams in Asia and in some developing countries use methylene chloride, CFC-11 and other blowing agents. The quantity of blowing agent varies according to the desired foam density and foam hardness as recognized by those skilled in the art. When used, the amount of hydrocarbon-type blowing agent varies from, e.g., a trace amount up to about 50 parts per hundred parts of polyol blend (pphp) and $CO_2$ varies from, e.g., about 1 to about 10 pphp of polyol blend.

Crosslinkers also may be used in the production of polyurethane foams. Crosslinkers are typically small molecules; usually less than 350 molecular weight, which contain active hydrogens for reaction with the isocyanate. The functionality of a crosslinker is greater than 3 and preferably between 3 and 5. The amount of crosslinker used can vary between about 0.1 pphp and about 20 pphp based on polyol blend and the amount used is adjusted to achieve the required foam stabilization or foam hardness. Examples of crosslinkers include glycerine, diethanolamine, triethanolamine and tetrahydroxyethylethylenediamine.

Silicone surfactants that may be used in the process of this invention include, e.g., "hydrolysable" polysiloxane-polyoxyalkylene block copolymers, "non-hydrolysable" polysiloxane-polyoxyalkylene block copolymers, cyanoalkylpolysiloxanes, alkylpolysiloxanes, and polydimethylsiloxane oils. The type of silicone surfactant used and the amount required depends on the type of foam produced as recognized by those skilled in the art. Silicone surfactants can be used as such or dissolved in solvents such as glycols. For flexible slabstock foams, the reaction mixture usually contains from about 0.1 to about 6 pphp of silicone surfactant, and more often from about 0.7 to about 2.5 pphp. For flexible molded foam the reaction mixture usually contains about 0.1 to about 5 pphp of silicone surfactant, and more often about 0.5 to about 2.5 pphp. For rigid foams, the reaction mixture usually contains about 0.1 to about 5 pphp of silicone surfactant, and more often from about 0.5 to about 3.5 pphp. The amount used is adjusted to achieve the required foam cell structure and foam stabilization.

Temperatures useful for the production of polyurethanes vary depending on the type of foam and specific process used for production as well understood by those skilled in the art. Flexible slabstock foams are usually produced by mixing the reactants generally at an ambient temperature of between about 20° C. and about 40° C. The conveyor on which the foam rises and cures is essentially at ambient temperature, which temperature can vary significantly depending on the geographical area where the foam is made and the time of year. Flexible molded foams usually are produced by mixing the reactants at temperatures between about 20° C. and about 30° C., and more often between about 20° C. and about 25° C. The mixed starting materials are fed into a mold typically by pouring. The mold preferably is heated to a temperature between about 20° C. and about 70° C., and more often between about 40° C. and about 65° C. Sprayed rigid foam starting materials are mixed and sprayed at ambient temperature. Molded rigid foam starting materials are mixed at a temperature in the range of about 20° C. to about 35° C. The preferred process used for the production of flexible slabstock foams, molded foams, and rigid foams in accordance with the present invention is the "one-shot" process where the starting materials are mixed and reacted in one step.

While the scope of the present invention is defined by the appended claims, the following examples illustrate certain aspects of the invention and, more particularly, describe methods for evaluation. The examples are presented for illustrative purposes and are not to be construed as limitations on the present invention.

Preparation of tertiary amine catalyst

The raw material solid RZETA® 1,4-diazabicyclo[2.2.2]octan-2-yl)methanol (CAS: 76950-43-1) for preparation of exemplary catalysts is available from Tosoh Corporation. The raw material 1,4-diazabicyclo[2.2.2]octan-2-yl)methanol might contain traces of 1,5-diazabicyclo[3.2.2]nonane-3-ol up to ~10%.

EXAMPLE 1

Preparation of tertiary amine catalyst 1

7.545 g of solid RZETA® (53.06 mmol) was dissolved in toluene (25 mL) at 50° C. Isophorone diisocyanate (5.850 g, 26.3 mmol) was dropwise continuously added to the mixture under nitrogen atmosphere and vigorous stirring by keeping the reaction temperature below 50° C. The reaction mixture was stirred at 70° C. for 2 hours. The reaction mixture was cooled down to room temperature. The mixture was transferred to a round flask using acetone and solvents were removed under vacuum on rotary evaporator at 80° C. to provide 13.7 g white powder. The structure of the obtained tertiary amine catalyst 1 was used in preparation of polyurethane foams without additional purification.

EXAMPLE 2

Preparation of tertiary amine catalyst 2

IPDI (5.913 g, 26.59 mmol) was added to a three neck round bottom flask under nitrogen atmosphere equipped with magnetic stirrer and thermometer. 3.785 mg solid RZETA® (26.62 mmol) was dissolved in toluene (8 mL) at room temperature under nitrogen atmosphere. The RZETA® solution was slowly added to the solution of IPDI via syringe at room temperature under nitrogen atmosphere under intensive mixing. The temperature of the reaction mixture was kept below 40° C. The reaction mixture was stirred at room temperature overnight. 2-[2-(dimethylamino)ethoxy]ethanol (3.577 g, 26.85 mmol) was added to the mixture and the mixture was stirred at 70° C. for additional 2 hours. The mixture was transferred to single-neck round bottom flask using acetone as other solvent and after, all solvents were removed under vacuum and a syrupy product was obtained.

EXAMPLE 3

Preparation of tertiary amine catalyst 3

Catalyst 3 was prepared analogously to Example 2 by changing the sequence of addition of RZETA® solution and 2-[2-(dimethylamino)ethoxy]ethanol. Thus, first RZETA® solution of toluene was added to IPDI and in second 2-[2-(dimethylamino)ethoxy]ethanol was added to the reaction mixture.

EXAMPLE 4

Catalyst 4 was prepared analogously to the Example 1 starting from solid RZETA® and hexamethylene diisocyanate.

EXAMPLE 5

Catalyst 5 was prepared analogously to the Example 2 by using hexamethylene diisocyanate instead of IPDI.

Preparation of Tertiary Catalyst Solutions.

The tertiary catalysts (Examples 1-5) and solid RZETA® were dissolved in water to obtain 33.3 wt-% aqueous solutions.

Polyurethane foams were prepared according to the following procedure. A premix of polyether polyol (Hyperlite® 1629), copolymer polyol (Hyperlite® 1651), cross-linker (90 wt-% aqueous solution of diethanolamine or DEOA), silicone stabilizer (Niax® L-3555) and water was prepared according to the Table 1 (in weight parts). From the premix, 6 similar batches each of 316.11 g were weighed to an appropriate mixing plastic container and 3.30 g 33.3% aqueous solutions of RZETA® (Reference composition 1) and corresponding tertiary amine catalysts (in Compositions 2-6) were correspondingly added to obtain 6 polyol blends (Table 1). The polyol blend was mixed thoroughly in the cardboard cup for 30 seconds using propeller stirrer with ring at 3000 rpm. Sucranate T80 isocyanate (TDI, with NCO content of 48.1%) was added and the reactive mixture was mixed for 4-6 seconds. The reactive mixture was poured into a 30×30×10 cm aluminum mold and the mold was immediately closed. The mold lid had 4 vent openings with a diameter of 0.4 mm at the four corners. Foams were demolded after 6 minutes. The mold temperature was controlled at 65° C. via a hot water circulating thermostat. Release agent Pura 1705 was used.

The physical characteristics of the foam were evaluated as follows:

| Physical Characteristic | Test Method |
|---|---|
| Density | ASTM D 3574 -05 |
| Exit Time | Exit time is the time elapsed, in seconds, from the addition of the isocyanate to the reaction mixture to the first appearance of foam extrusion from the four vents of the mold. |
| Force-to-Crush | ASTM 3574-05. Force-to-crush (FTC) is the peak force required to deflect a foam pad with the standard 323 $cm^2$ (50 sq. in.) indentor, 1 minute after demold, to 50% of its original thickness. It is measured with a load-testing machine using the same setup as that used for measuring foam hardness. A load tester crosshead speed of 50.8 cm/minute is used. The FTC value is a good relative measure of the degree of cell openness characteristic of a foam, i.e., the lower the value, the more open the foam. |
| Hot ILD | ASTM 3574-05. The indentation load deflection (hot ILD) is measured on the same pad used for the FTC measurement 3 minutes after demold. Following the FTC measurement, the foam pad is completely crushed by a mechanical crusher before the measurement of ILD at 50% compression is taken. The hot ILD value is a good relative measure of the curing degree of a foam 3 minutes after demold. The higher the hot ILD value, the higher the curing degree of the foam. |
| ILD | ASTM 3574-05. The indentation load deflection (ILD) is measured on the same pad used for the FTC and hot ILD measurements at least 48 hours after demold. Following the FTC and hot ILD measurements, the foam pad is completely crushed by a mechanical crusher before the measurement of ILD at 50% compression is taken. The ILD value is a good relative measure of the curing degree of a foam at least 48 hours after demold. The higher the ILD value, the higher the curing degree of the foam. |
| HACS | Humid Aging Compression Set. Compression Set (50% compression at 70° C. for 22 h, ISO 1856) Humid Aging(0 h, 5 h, 10 h, 15 h at 120° C. at 100% relative humidity, D3574-05) |

The amine catalysts from RZETA® and Examples 1-5 were dissolved in water to obtain 33.3 wt-% aqueous solutions. Those aqueous solutions were used for making polyurethane foams (Table 1). Composition 1 is a comparative example using RZETA® available from Tosoh as received. Compositions 2-6 employ a tertiary amine compound (Examples 1 to 5) in accordance with aspects and embodiments of the present technology.

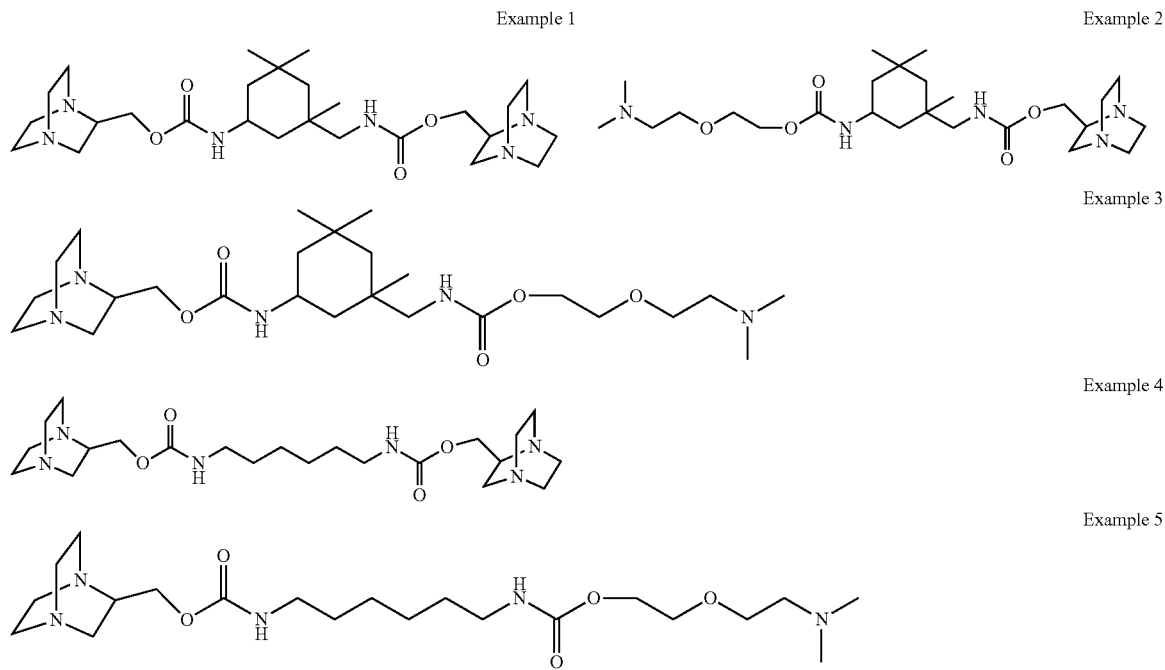

Various properties of the foam were evaluated. The properties are shown in the lower part of Table 1:

TABLE 1

Mould dimensions 30 * 30 * 10 cm
Mould temperature 65° C.
Demoulding time 6 Minutes
Demoulding agent Pura 1705

| | OH Value or NCO % | \multicolumn{6}{c}{Compositions} | | | | | |
|---|---|---|---|---|---|---|---|
| | | 1 | 2 | 3 | 4 | 5 | 6 |
| Hyperlite ® 1629 | 31.5 | 50.00 | 50.00 | 50.00 | 50.00 | 50.00 | 50.00 |
| Hypelite ® 1651 (styrene acrylonitrile grafted polyether polyol) | 20 | 50.00 | 50.00 | 50.00 | 50.00 | 50.00 | 50.00 |
| DEOA (90% in water) | 2065 | 1.66 | 1.66 | 1.66 | 1.66 | 1.66 | 1.66 |
| Water | 6234 | 2.71 | 2.71 | 2.71 | 2.71 | 2.71 | 2.71 |
| Niax ® Silicone L-3555 | 0 | 1.00 | 1.00 | 1.00 | 1.00 | 1.00 | 1.00 |
| RZETA ® 33.33% in water | 4288 | 1.10 | | | | | |
| 33.3% of catalyst from Example 1 in water | 4156 | | 1.10 | | | | |
| 33.3% of catalyst from Example 2 in water | 4156 | | | 1.10 | | | |
| 33.3% of catalyst from Example 3 in water | 4156 | | | | 1.10 | | |
| 33.3% of catalyst from Example 4 in water | 4156 | | | | | 1.10 | |
| 33.3% of catalyst from Example 5 in water | 4156 | | | | | | 1.10 |
| Total water | | 3.61 | 3.61 | 3.61 | 3.61 | 3.61 | 3.61 |
| TDI Sucranate T80 | 48.1 | 42.97 | 42.75 | 42.75 | 42.75 | 42.75 | 42.75 |

TABLE 1-continued

Mould dimensions 30 * 30 * 10 cm
Mould temperature 65° C.
Demoulding time 6 Minutes
Demoulding agent Pura 1705

| OH Value or NCO % | Compositions | | | | | |
|---|---|---|---|---|---|---|
| | 1 | 2 | 3 | 4 | 5 | 6 |
| Properties of Compositions | | | | | | |
| Isocyanate Index | 100 | 100 | 100 | 100 | 100 | 100 |
| Exit time [sec] | 67 | 48 | 51 | 48 | 64 | 57 |
| FTC [N] | 301 | 450 | 579 | 427 | 253 | 514 |
| Hot ILD [N] | 119 | 161 | 128 | 120 | 106 | 104 |
| ILD [N] | 455 | 514 | 465 | 505 | 428 | 449 |
| Weight of molded block [g] | 368 | 364 | 365 | 360 | 365 | 367 |
| Density [kg/m³] | 41 | 40 | 41 | 40 | 41 | 41 |
| HACS 0 h [%] | 5 | 5 | 5 | 5 | 4 | 5 |
| HACS after 5 h humid aging [%] | 34 | 35 | 38 | 36 | 35 | 39 |
| HACS after 10 h humid aging [%] | 33 | 36 | 38 | 37 | 43 | 43 |
| HACS after 15 h humid aging [%] | 45 | 44 | 45 | 44 | 45 | 45 |

As illustrated in the lower part of Table 1, the properties of the foams produced with the catalysts from Examples 1 to 5 perform as well as or better than the foams employing the commercial catalysts. The amine catalyst from Example 1 provided a foam even with better polymerization as indicated by the hot ILD and hot ILD than did the foam made by state of the art comparative catalyst RZETA® in composition 1. Compositions 3-6 also generally showed suitable exit times and comparable hot ILD, ILD and force to crush values.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various, non-limiting embodiments of a tertiary amine compound and foams provided using such compounds as catalysts. Modifications may occur to those skilled in the art and to those who may make and use the invention. The disclosed embodiments are merely for illustrative purposes and not intended to limit the scope of the invention or the subject matter set forth in the claims.

What is claimed is:

1. A tertiary amine compound of the Formula (I):

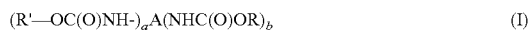

$$(R'\text{—OC(O)NH-})_a A(NHC(O)OR)_b \quad (I)$$

where a is 1-6 and b is 1-4;
R' is a bicyclic tertiary amine:
A is chosen from a C2-C35 hydrocarbon optionally comprising a halogen, an ether group, a tertiary amine or a combination thereof; and
R is chosen from a C1-C10 hydrocarbon, a C1-C10 ether, or a group selected from the following Formulas (II)-(VI-b):

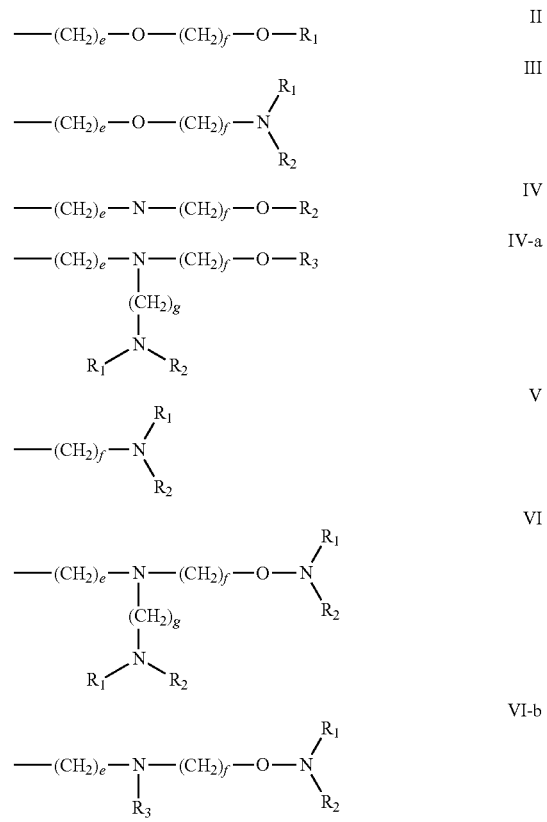

where e, f, and g are independently selected from 2-6; $R_1$-$R_4$ are independently chosen from a C1-C9 hydrocarbon, optionally wherein $R_1$ and $R_2$ optionally form a ring and/or $R_3$ and $R_4$ optionally form a ring.

2. A process for producing a polyurethane comprising reacting, in a composition, an isocyanate compound with an alcohol in the presence of a catalyst, wherein the catalyst is chosen from a tertiary amine compound of the Formula (I):

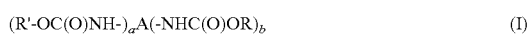

$$(R'\text{-OC(O)NH-})_a A(\text{-NHC(O)OR})_b \quad (I)$$

where a is 1-6 and b is 0-5;

R' comprises a bicyclic tertiary amine:

A is chosen from a C2-C35 hydrocarbon optionally comprising a halogen, an ether group, a tertiary amine or combination thereof; and R is chosen from a C1-C35 hydrocarbon optionally containing an ether group, a halogen group, a tertiary amine group, a bicyclic tertiary amine group, or a combination of two or more thereof.

3. The process of claim 2, wherein R' is chosen from:

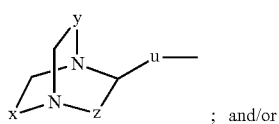   (VII)

; and/or

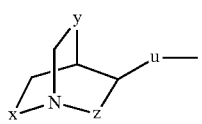   (VIII)

where x, y, z, and u are independently chosen from a bond, a C1-C35 hydrocarbon, a sulfonate ester, or a phosphate ester, where the C1-C35 hydrocarbon in x, y, z, and/or u optionally contains a halogen group, an ether group, a carbonate, an amide, a tertiary amine, or a combination of two or more thereof.

4. The process of claim 2, wherein R' is chosen from

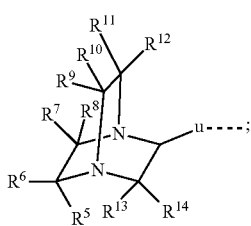   (IX)

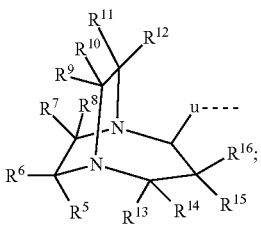   (X)

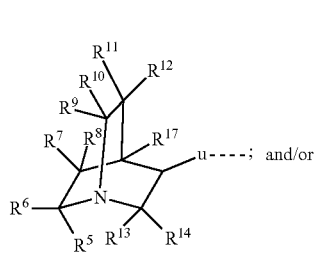   (XI)

; and/or

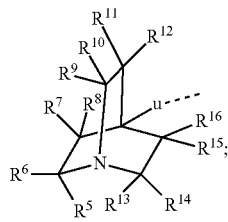   (XII)

where R5-R17 are individually chosen from hydrogen, a halogen, a C1-C10 hydrocarbon, carbonate, an ether group, an amide, and a tertiary amine, and u is selected from a bond, a C1-C35 hydrocarbon, a sulfonate ester, or a phosphate ester.

5. The process of claim 2, wherein the tertiary amine compound is of the formula:

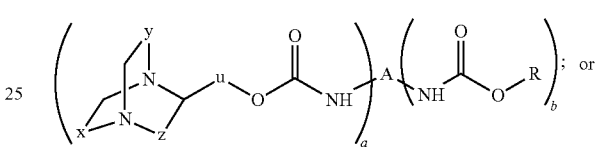   (XIII)

; or

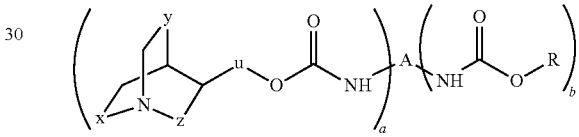   (XIV)

where x, y, z, and u are independently chosen from a bond, a C1-C35 hydrocarbon, a sulfonate ester, or a phosphate ester, where the C1-C35 hydrocarbon in x, y, z, and/or u optionally contains a halogen group, an ether group, a carbonate, an amide, a tertiary amine, or a combination of two or more thereof.

6. The process of claim 2, wherein (i) a is 1, 2, or 3; (ii) a is 1 and b is 1; or a is 2 and b is 0.

7. The process of claim 2, wherein A is chosen from a C2-C20 hydrocarbon residue optionally further including a halogen, a tertiary an amine, an ether, or a nitro group.

8. The process of claim 2, wherein b is 1-4, and R is chosen from (1) a C1-C10 hydrocarbon optionally comprising an ether group, or (2) a group selected from the following Formulas (II)-(VI-b):

$$—(CH_2)_e—O—(CH_2)_f—O—R_1 \quad \text{II}$$

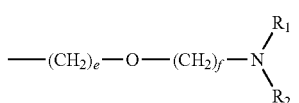   III $$—(CH_2)_e—N—(CH_2)_f—O—R_2 \quad \text{IV}$$

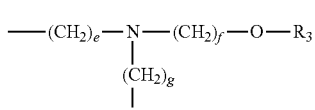   IV-a

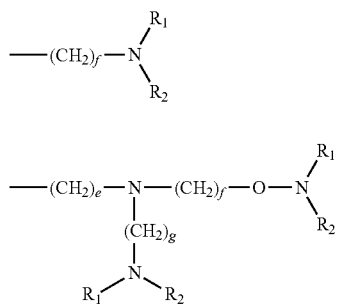

V

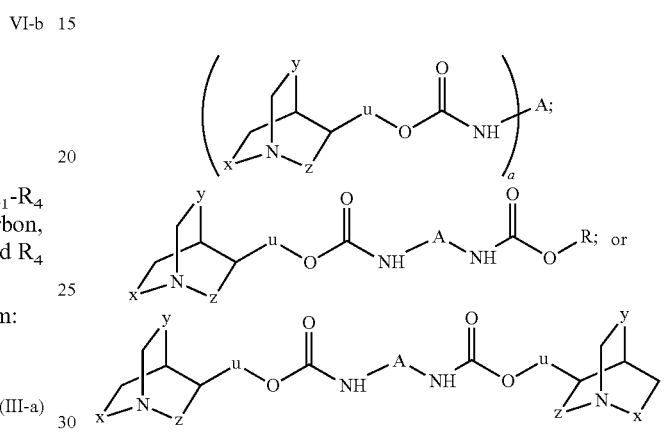

VI where e, f, and g are independently selected from 2-6.

10. The process of claim 2, wherein the tertiary amine compound is chosen from a compound of the formula:

VI-b where e, f, and g are independently selected from 2-6; $R_1$-$R_4$ are independently chosen from a C1-C9 hydrocarbon, wherein Ri and R2 optionally form a ring and/or $R_3$ and $R_4$ optionally form a five to ten member ring.

9. The process of claim 8, wherein R is chosen from:

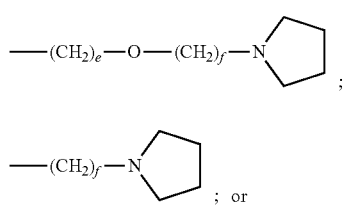

where x, y, z, and u are independently chosen from a bond, a C1-C35 hydrocarbon, a sulfonate ester, or a phosphate ester, where the C1-C35 hydrocarbon in x, y, z, and/or u optionally contains a halogen group, an ether group, a carbonate, an amide, a tertiary amine, or a combination of two or more thereof.

11. The process of claim 2, wherein the tertiary amine compound is chosen from:

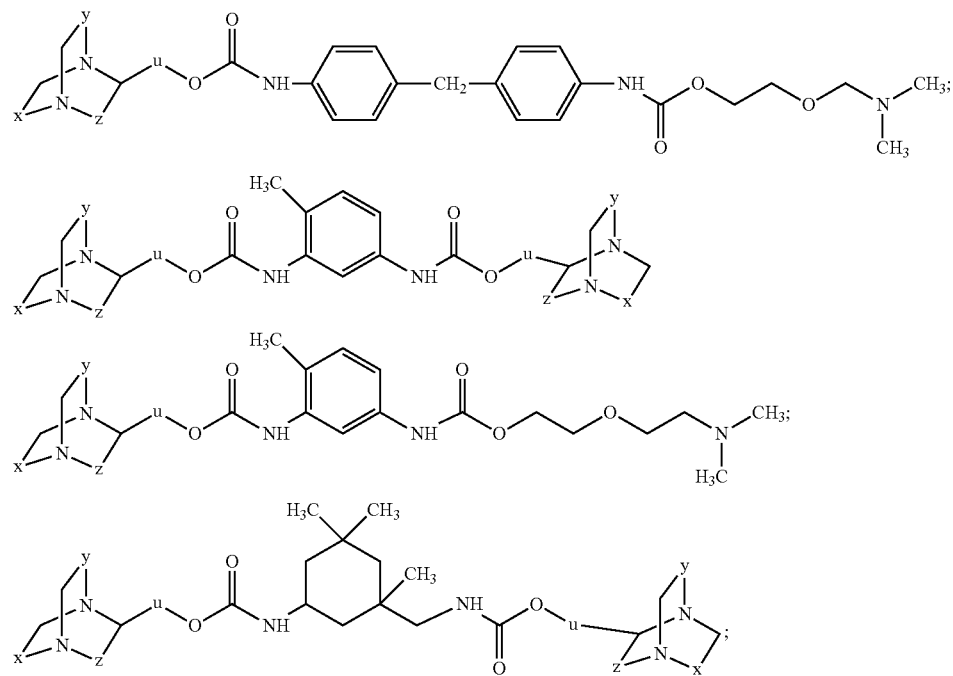

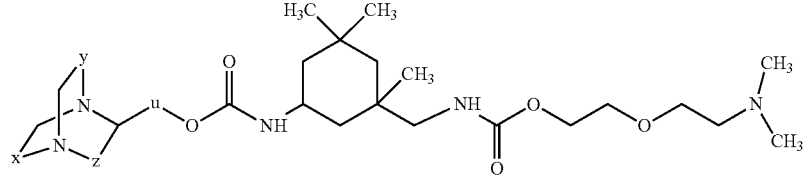

or a combination of two or more thereof where x, y, z, and u are independently chosen from a bond, a C1-C35 hydrocarbon, a sulfonate ester, or a phosphate ester, where the C1-C35 hydrocarbon in x, y, z, and/or u optionally contains a halogen group, an ether group, a carbonate, an amide, a tertiary amine, or a combination of two or more thereof.

12. The process of claim 11, wherein u, x, y, and z are each —CH$_2$-.

13. The process of claim 2, wherein the tertiary amine compound is chosen from:

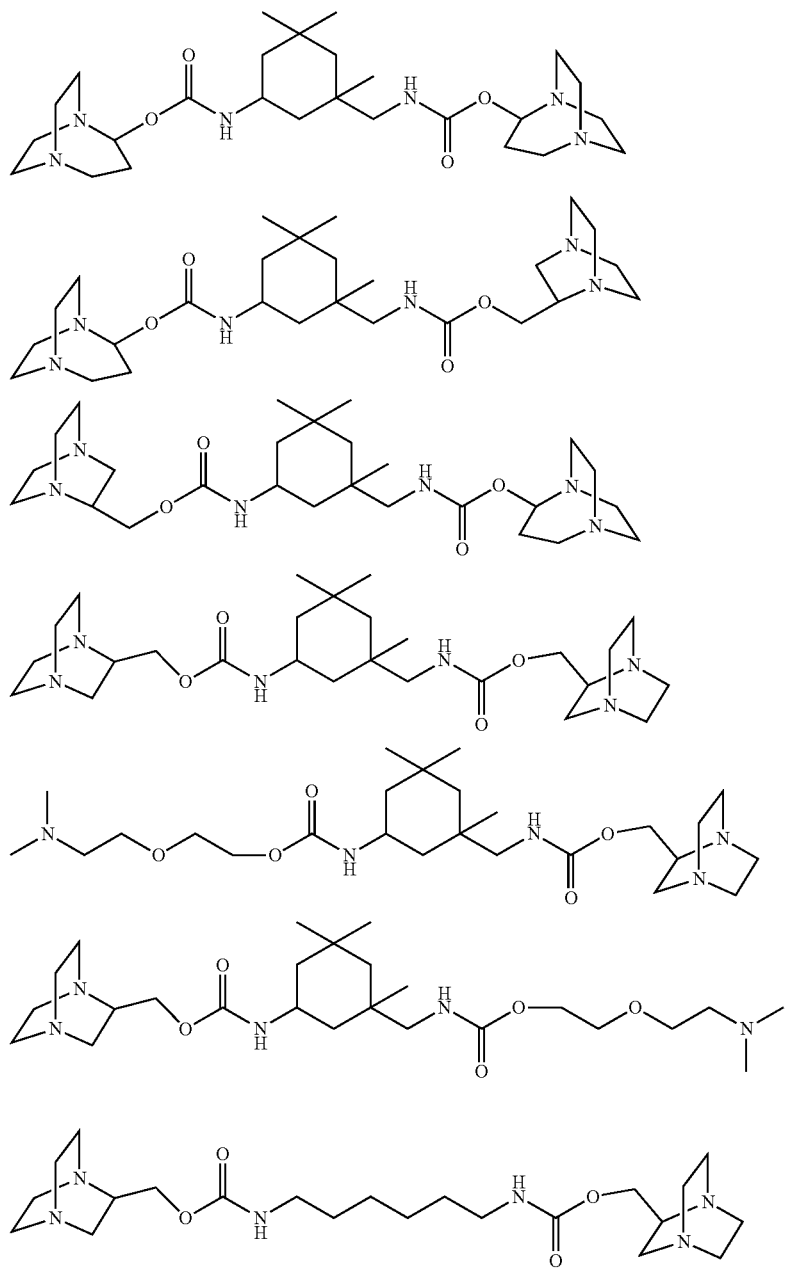

-continued

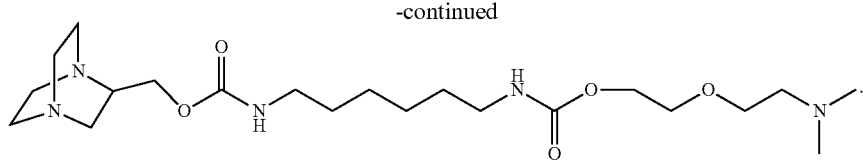

14. The process of claim 2, wherein the catalyst is part of a catalyst composition comprising a diluent.

15. The process of claim 2, wherein the polyurethane is a cellular or non-cellular polyurethane, and the process optionally comprises a blowing agent.

16. The process of claim 2, wherein the polyurethane is a polyurethane foam, and the process optionally comprises reacting in the presence of a surfactant, a fire retardant, a chain extender, a cross-linking agent, an adhesion promoter, an anti-static additive, a hydrolysis stabilizer, a UV stabilizer, a lubricant, an anti-microbial agent, or a combination of two or more thereof.

17. The process of claim 2, wherein the catalyst is present in an amount of from about 0.005 wt-% to about 5 wt-% based on the weight of the composition.

18. A polyurethane foam formed from the process of claim 2.

* * * * *